US006316711B2

(12) United States Patent
Matsuda et al.

(10) Patent No.: US 6,316,711 B2
(45) Date of Patent: Nov. 13, 2001

(54) MUSICAL SOUND SIGNAL GENERATION APPARATUS

(75) Inventors: Eiji Matsuda, Shizuoka-ken; Jiro Tanaka, Hamamatsu; Tsutomu Saito, Shizuoka-ken, all of (JP)

(73) Assignee: Kabushiki Kaisha Kawai Gakki Seisakusho, Hamamatsu (JP)

( * ) Notice: Subject to any disclaimer, the term of this patent is extended or adjusted under 35 U.S.C. 154(b) by 0 days.

(21) Appl. No.: 09/771,055

(22) Filed: Jan. 26, 2001

Related U.S. Application Data

(63) Continuation-in-part of application No. 09/504,647, filed on Feb. 14, 2000, now Pat. No. 6,198,035.

(30) Foreign Application Priority Data

| | | |
|---|---|---|
| Feb. 16, 1999 | (JP) | 11-36423 |
| Feb. 17, 1999 | (JP) | 11-38785 |
| Mar. 22, 2000 | (JP) | 12-080116 |

(51) Int. Cl.[7] .............................. G01H 1/18; G01H 7/00
(52) U.S. Cl. .............................. 84/615; 84/618; 84/622; 84/653; 84/656; 84/659
(58) Field of Search .................... 84/600–606, 609–610, 84/615–616, 618, 622–625, 649–650, 653–654, 656, 659–660, DIG. 27, 665

(56) References Cited

U.S. PATENT DOCUMENTS

| | | | | |
|---|---|---|---|---|
| 5,127,306 | * | 7/1992 | Mitsuhashi et al. | 84/665 |
| 5,192,824 | * | 3/1993 | Shibukawa | 84/615 |
| 5,315,059 | * | 5/1994 | Saito | 84/656 |
| 5,783,766 | * | 7/1998 | Tanaka | 84/618 |
| 5,804,755 | * | 9/1998 | Furukawa | 84/656 |

FOREIGN PATENT DOCUMENTS 10-49159 2/1998 (JP) .

* cited by examiner

*Primary Examiner*—Marlon T. Fletcher
(74) *Attorney, Agent, or Firm*—Davis & Bujold, P.L.L.C

(57) ABSTRACT

A musical sound signal generation apparatus for producing a sound corresponding to an operated key can produce a sound of a newly-operated key even if all the musical sound signal generation means for generating a musical sound signal are in use. On producing the new sound, the apparatus prevents the players and the audience from having a sense of incongruity derived from the change in sound production. Especially, when a chord has been produced, it can maintain the state of chord production normally.

4 Claims, 6 Drawing Sheets

MUSICAL SOUND SIGNAL GENERATION APPARATUS

This is a continuation-in-part of a application Ser. No. 09/504,647 filed Feb. 14, 2000, now U.S. Pat. No. 6,198,035 and entitled "Musical Sound Signal Generation Apparatus".

FIELD OF THE INVENTION

This invention relates to a musical sound signal generation apparatus for generating a sound corresponding to an operated key, more particularly to an apparatus for, when a plurality of keys are simultaneously depressed, generating musical sounds corresponding to each key.

BACKGROUND OF THE INVENTION

An electronic instrument as typified by an electronic piano conventionally includes a pair of musical sound signal generation means for generating two musical sound signals for one key operation (key-on) for stereo performance. If such pair of musical sound signal generation means are provided as much as the number of the keys, musical sound signals for sound production can be securely generated. However, the increase in number of the musical sound signal generation means accompanies the increase in costs as well.

Therefore, the applicant has developed a musical sound signal generation apparatus to effectively utilize the musical sound signal generating means as disclosed in the Unexamined Japanese Patent Publication No. 10-49159. Teaching of this Publication is that if a new key-on is made when all the musical sound generation means are in use, two pairs of the oldest musical sound signal generation means in order of sound production are selected from all the musical sound signal generation means in the sounding mode, and one of the musical sound signal generation means constituting each pair is truncated (rapidly attenuated), while the remaining musical sound signal generation means operate as they are. Thereby, since two musical sound signal generation means are changed into the silent mode (become free), they can be reused as the musical sound signal generation means for generating musical sound signals in stereo sounding, corresponding to a fresh key-on.

However, in case of the musical sound signal generation apparatus of the above Publication, when all of the musical sound signal generation means are in use and that the oldest musical sound signal generation means in order of sound production is generating one of the musical sound signals which constitute a chord (for example, a chord consisting of 3 or 4 different tones), if this musical sound signal generation means is silenced and reused as the musical sound signal generation means for stereo sounding corresponding to a fresh key-on, there is a fear that the players and/or the audience may feel uncomfortable for lack of the sound in the chord.

SUMMARY OF THE INVENTION

An object of the present invention is, in a musical sound signal generation apparatus for producing a sound corresponding to an operated key, even though musical sound signal generation means for generating a musical sound signal are all in use, to secure musical sound signal generation means for sound production corresponding to a newly operated key, and when securing the musical sound signal generation means, to prevent the players and/or the audience from having a sense of incongruity derived from the change in sound production especially when a chord is being produced, to maintain the state of the chord production normally.

To attain the above object, the first aspect of the present invention provides a musical sound signal generation apparatus comprising a plurality of musical sound signal generation means and a generation mode storage means. The musical sound signal generation means generate musical sound signals, and the generation mode storage means stores information on whether the musical sound signal generation means are in the sounding mode or in the silent mode, and the order in which each of the musical sound signal generation means has changed into the sounding mode.

The musical sound signal generation apparatus further comprises an assigning means and output means. When a key is operated, the assigning means refers to storage contents of the generation mode storage means to select two of the musical sound signal generation means in the silent mode, assigns the selected two musical sound signal generation means to generate left and right musical sound signals for producing a predetermined sound in stereo sounding corresponding to the key in the selected two musical sound signal generation means, and updating the storage contents of the generation mode storage means. Then, the output means synthesize the left and right musical sound signals generated in the plurality of musical sound signal generation means and respectively output the synthesized left and right musical sound signals.

Specifically, the assigning means of the musical sound signal generation apparatus of the present invention is provided with a first generation mode determination means, a second generation mode determination means, a first signal generation ensuring means and output control means, which operate as follows.

When a key is operated, the first generation mode determination means refers to the storage contents of the generation mode storage means to determine whether there are musical sound signal generation means in the silent mode. When no musical sound signal generation means in the silent mode exist, the second generation mode determination means refers to the storage contents of the generation mode storage means, and from the musical sound signal generation means excluding a predetermined number of those which are the newest in order of sound production, determines whether there are at least two pairs of the musical sound signal generation means generating left and right musical sound signals in stereo sounding.

When two or more pairs of the musical sound signal generation means generating left and right musical sound signals in stereo sounding exist, the first signal generation ensuring means arbitrarily selects two pairs of the musical sound signal generation means from those in stereo sounding, changes one of each pair of the musical sound signal generation means into the silent mode, and updates the storage contents of the generation mode storage means. The output control means output musical sound signals generated in the other one of each pair of the musical sound signal generation means as left and right musical sound signals from each of the two musical sound signal generation means.

Accordingly, when a key is operated, even though the plurality of the musical sound signal generation means are all in use (that is, generating musical sound signals), by selecting two pairs of the musical sound signal generation means and silencing one of each pair of the musical sound signal generation means, the musical sound signal generation apparatus of the present invention can secure two musical sound signal generation means in the silent mode as those for stereo sounding corresponding to the key.

Additionally, since the musical sound signal generation means to be silenced are arbitrarily selected from the same excluding a predetermined number of those which are the newest in order of sound production, it is possible to prevent the players and the audience from having a sense of incongruity caused by silencing a sound of the key just operated. Thereby, when all the musical sound signal generation means are changed into the sounding mode upon the production of a chord and then another key is further operated, for example, the sound of the key operated prior to the chord is silenced and the chord reaches the ears of the players and the audience without being deteriorated. This means that it is difficult for the players and the audience to recognize the fact that the sound of the key previously operated has been silenced.

Specifically, if the musical sound signal generation means which are not generating musical sound signals for a chord are given precedence in arbitrary selection of the musical sound signal generation means to be silenced, it is possible to keep the state of the chord production normal at every moment.

In the two musical sound signal generation means maintained without being silenced, the generated musical sound signals are outputted as both left and right musical sound signals respectively so that the musical sound signals to be outputted from the output means may be produced in "monaural sounding". Thereby, the output means can maintain the balance of the left and right sounds upon outputting them.

Meanwhile, in the musical sound signal generation apparatus of the present invention, when all the musical sound signal generation means are in use and keys are operated one after another, all the musical sound signal generation means, excluding the predetermined number of those which are the newest in order of sound production, may generate the musical sound signals in "monaural sounding".

Accordingly, the second aspect of the present invention provides the assigning means comprising a second signal generation securing means for, in case that at least two pairs of the musical sound signal generation means generating left and the right musical sound signals in stereo sounding do not exist, silencing two of the oldest musical sound signal generation means in order of sound production and updating the storage contents of the generation mode storage means.

With such constitution, even if all the musical sound signal generation means excluding the predetermined number are generating the musical sound signals in "monaural sounding", by changing two of the musical sound signal generation means in monaural sounding into the silent mode, the two musical sound signal generation means can be secured for musical sound signal generation means for stereo sounding corresponding to a fresh key. In addition, because the musical sound signal generation means to be silenced are selected from those of the oldest in order of sound production, the players and the audience are not given a sense of incongruity occurred by silencing a sound of the key just operated.

Meanwhile, the two musical sound signal generation means not silenced by the first signal generation securing means are changed into monaural sounding from stereo sounding, by outputting the musical sound signals as left and right musical sound signals from each of the musical sound signal generation means. When the musical sound signal generation means are in monaural sounding, it is necessary to avoid giving a sense of incongruity derived from the change in sound production to the players and the audience.

The third and fourth aspects of the present invention provide the output control means comprising a correction panning means for performing a panning processing and a volume correction means for adjusting the outputting volume of musical sound signals to be outputted simultaneously from both the left and right output means, respectively, so that a predetermined sound image is obtained corresponding to the operated key. With such constitution, for example, if the operated key is located on the side of the higher notes, then by relatively increasing a panning value or the volume of the right output, or if the key is on the side of the lower notes, then by relatively increasing the panning value or the volume of the left output, a pseudo-stereo effect can be obtained.

BRIEF DESCRIPTION OF THE DRAWING FIGURES

The invention will now be described in detail with reference to the accompanying drawings, in which.

DETAILED DESCRIPTION OF THE PREFERRED EMBODIMENT

A musical sound signal generation apparatus of the present embodiment is incorporated into a keyboard type electronic instrument and used for outputting musical sounds.

Figure 1:
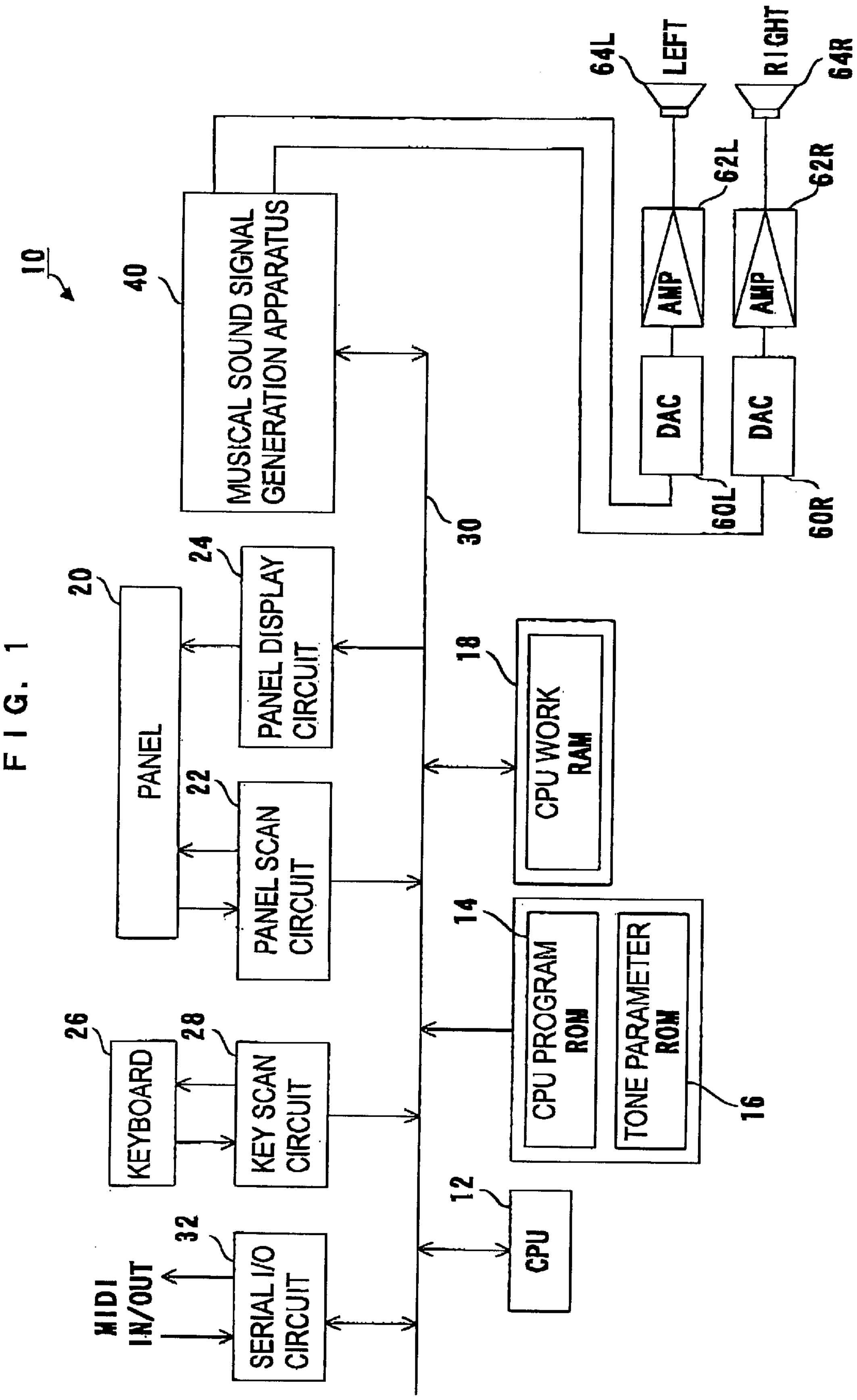
FIG. 1 is a block diagram showing the entire constitution of a musical sound signal generation apparatus of an embodiment.

As shown in FIG. 1, an electronic instrument 10 according to an embodiment of the present invention comprises a CPU 12, a CPU program ROM 14, a tone parameter ROM 16, a CPU work RAM 18, a panel 20, a keyboard 26, a musical sound signal generation circuit 40 and a bus line 30 which connects all of the above-mentioned components. Since a serial input/output circuit 32 is connected to the bus line 30, the electronic instrument 10 can also produce musical sounds by means of MIDI signals inputted externally to the serial input/output circuit 32, in addition to the production of the musical sounds by operations (i.e. key-on or key-off) on the keyboard 26.

The control processing for producing a musical sound is performed as follows. A control program for generating a musical sound is stored in the CPU program ROM 14. According to the control program, the CPU 12 scans the keyboard 26 to read the performance information, such as a key-on/key-off, a key number and touch information. It then assigns a channel (musical sound generation channel) for generating a digital musical sound signal in the musical sound signal generation circuit 40, scans the panel 20 to read the operation mode of various switches provided on the panel 20, and finally conducts sound production control of the musical sound generation channel.

In the tone parameter ROM 16, stereo tone parameters and monaural tone parameters are stored. Each tone parameter includes attack, decay and release envelope data, a wave start address, and L and R panning coefficients. For the stereo tone parameters, the envelope data, wave start address and L and R panning coefficients are provided in pair of L side and R side, and for the monaural tone parameters, the envelope data, wave start address and L and R panning coefficients are provided in L/R common.

The panning coefficient is a parameter to be used in a panning process performed in the musical sound signal generation circuit 40, which will be described later, and it changes a ratio of left and right musical sound volumes corresponding to the key number (i.e. position of the pressed key on the keyboard 26) directed by the CPU 12. For example, if the key number indicates the key on the right-of-center side of the keyboard 26, the larger volume is set to the right system than the volume set to the left system. On the contrary if the key number indicates the key on the left-of-center side of the keyboard 26, the larger volume is set to the left system than the volume set to the right system.

In the present embodiment, the panning coefficients are set between numerical values from 0 to 100. In the stereo tone parameters, the L panning coefficient on the L side is set to 70, and the R panning coefficient on the L side is set to 0, for each of the low, medium, and high tones. Conversely, the R panning coefficient on the R side is set to 70, and the L panning coefficient on the R side is set to 0, for each of the low, medium, and high tones. Accordingly, because the L and R panning coefficients are provided on both the L and R sides, the values can be set by changing a sound image position based on the number of the pressed key.

In the present embodiment, the L panning coefficient of the monaural tone parameters gradually decreases from 80 to 40 as the tone goes low to high, and the R panning coefficient of the monaural tone parameters gradually increases from 40 to 80 as the tone goes low to high. The middle tone is set to be 70 in both the L/R panning coefficients.

The CPU work RAM 18 is not only used as a work area of the CPU 12, but also it stores the operation mode of the musical sound generation channels used for musical sound generation. The CPU program ROM 14 stores control programs and musical data for auto-playing. In case that the musical sound signal generation apparatus of the present invention is set to the auto-playing mode by an operation of the panel 20, the CPU 12 may generate musical sounds for auto-playing in the musical sound signal generation circuit 40 in accordance with the musical data for auto-playing. The CPU work RAM 18 is provided with batteries so that it may not lose the stored date even if the power supply to the electronic instrument is cut off.

The panel 20 comprises various selection switches such as for tones, a display device having a LED or LCD, a panel scan circuit 22 for reading the information of each switch under the control of the CPU 12, and a panel display circuit 24 for operating the display device. The keyboard 26 comprises, for example, a plurality of keys, each of which having two switches, and a key scan circuit 28 for scanning the switching state of each key under the control of the CPU 12.

In the electronic instrument 10 of the present embodiment, when a key on the keyboard 26 is operated, the key scan circuit 28 detects a key-on or a key-off, transmits the detected key-on/key-off information along with the key number information to the bus line 30. The information including the key number transmitted to the bus line 30 are received by the CPU 12 and the musical sound signal generation circuit 40, and also stored by the CPU work RAM 18 under the control of CPU 12.

Figure 2:
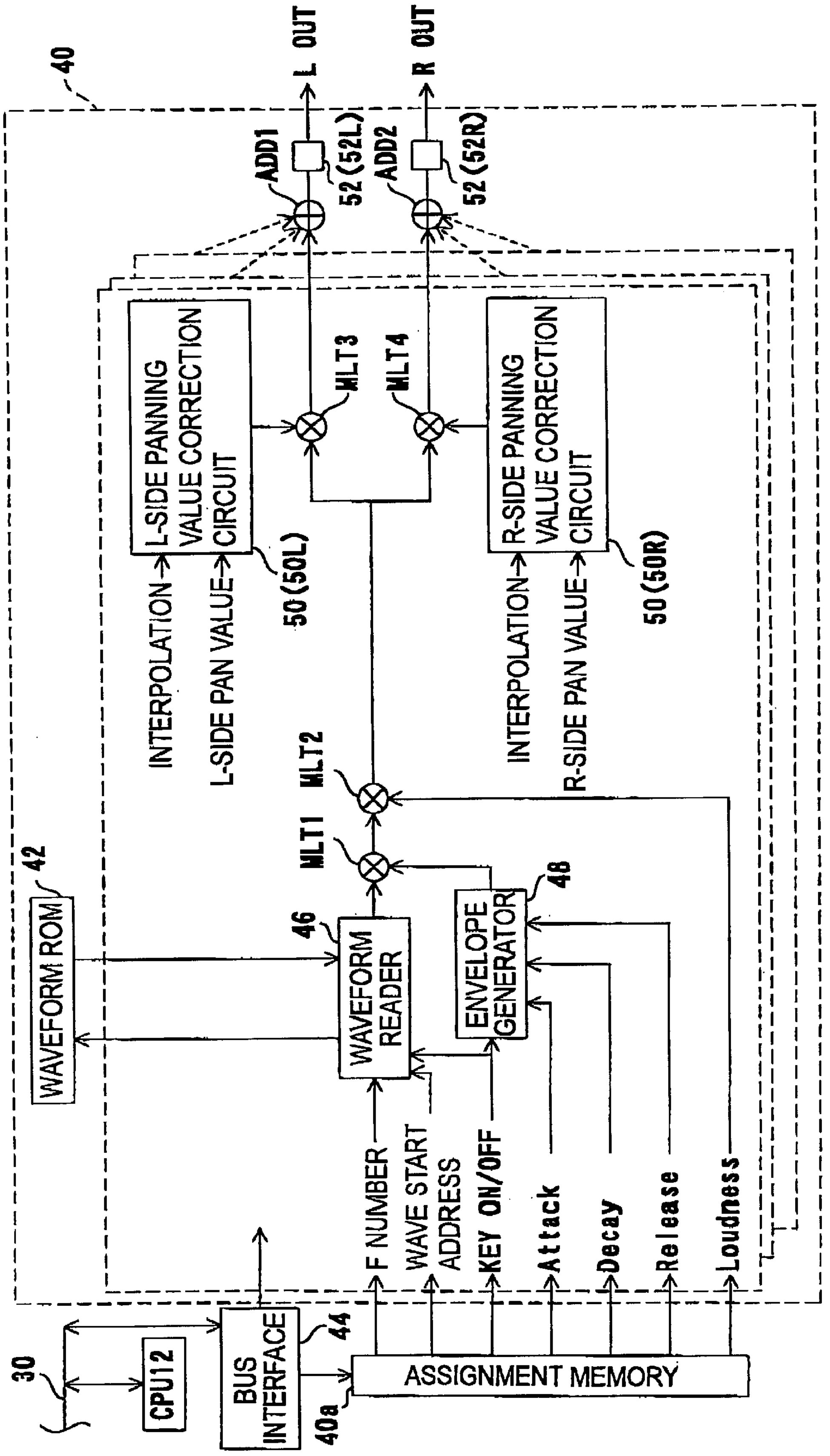
FIG. 2 is a block diagram showing the entire constitution of the musical sound signal generation apparatus of the embodiment.

FIG. 2 is a block diagram showing an example of a constitution of the musical sound signal generation circuit 40 indicated in FIG. 1.

The musical sound signal generation circuit 40 can generate individual musical sound signals of a plurality of musical sound generation channels i.e. 32 channels in the present embodiment by time division multiplexing processing under the control of the CPU 12. In FIG. 2, the function of only one channel is shown for easy understanding. Each musical sound generation channel is numbered from 1*ch* to 32*ch* in the present embodiment.

This musical sound signal generation circuit 40 comprises a waveform ROM 42 for storing a plurality of sample waveform data, a bus interface 44, a waveform reader 46 for reading sample waveform data from the waveform ROM 42 and generating a sample waveform based on the read sample waveform data, an envelope generator 48 for generating an envelope signal used for controlling the sound quality, and an assignment memory 40*a*, which is a RAM, for operating as a part of the musical sound signal generation circuit 40.

The bus interface 44, as a result that the various data (for instance, the key-on/key-off information and key number information) stored in the CPU work RAM 18 are read by the CPU 12, receives the data transmitted from the CPU 12 via the bus line 30, and transmits them to the waveform reader 46 and the envelope generator 48. The waveform reader 46, in accordance with the transmitted key number information, generates a waveform memory read address corresponding to the pitch. The waveform memory 42 is a memory for storing the musical waveform information corresponding to various tones. The envelope generator 48 generates an envelope signal to control a musical sound in accordance with the key-on/key-off information.

The assignment memory 40*a* stores various key assignment information for each musical sound generation channel. Key-on/key-off information, key number information, a wave start address, L and R panning coefficients, attack, decay and release envelope data, and loudness data are the assignment information for one channel. The assignment memory 40*a* can store the assignment information for 32 channels.

The stored key-on/key-off and key number information are transmitted from the key scan circuit 28 to the bus line 30. The wave start address, the L and R panning coefficients and the envelope data are obtained from the tone parameter ROM 16 based on the tone selection switch on the panel 20. For the loudness data, the position of the volume controller is detected by the panel scan circuit 22, converted to a numerical value and transmitted to the bus line 30. The assignment memory 40*a* stores the data related to the key number, tone and sound volume corresponding to the sample waveform generated by each musical sound generation channel.

In the musical sound generation circuit 40 constituted as such, a F number corresponding to the key number from the assignment memory 40*a*, the wave start address and the key-on/key-off information are inputted to the waveform reader 46. In the waveform reader 46, the wave start address is added to the integer part of the F number. The data after the addition specifies the address in the waveform ROM 42. Then, the waveform reader 46 reads the sample waveform data specified by the address, and uses the decimal part of the F number to apply an interpolation processing to the sample waveform data.

The sample waveform data outputted from the waveform reader 46 are transmitted to a multiplier MLT1. The envelope data from the envelope generator 48 are inputted to the multiplier MLT1, and the sample waveform data are multiplied by the envelope data. This envelope data are based on the attack, decay and release envelope data supplied from the assignment memory 40 to the envelope generator 48, and the key-on/key-off information. In addition, the sample waveform data are multiplied by the loudness data from the assignment memory 40*a* in a multiplier MLT2.

By multiplying the envelope data by the loudness data, the musical sound signal to generate the sound corresponding to the operated key is generated. The generated musical sound signal is transmitted to the panning circuit 50.

The panning circuit 50 comprises an L side panning value interpolation circuit 50L and a multiplier MLT3, and an R side panning value interpolation circuit 50R and a multiplier MLT4. An accumulation circuit 52 on the downstream side includes an adder ADD3 and a latch 52L, and an adder ADD4 and a latch 52R.

The L side panning value interpolation circuit 50L and the R side panning value interpolation circuit 50R are notified of the presence/absence of interpolation from the CPU 12, and when there is interpolation, transmit the panning coefficients (pan values) obtained from the assignment memory 40*a* to the multipliers MLT3 and MLT4. When the panning coefficients are transmitted to the multipliers MLT3 and MLT4, the musical sound signal is multiplied by the panning coefficients.

The musical sound signal is transmitted to the latches 52L, 52R via the adders ADD1, ADD2, and an accumulation processing is performed for all the channels. The accumulated musical sound signal is analog-converted, amplified, and outputted as a musical sound to the left and right output systems as described below.

Turning back to FIG. 1, the musical sound signal generation circuit 40 is connected to the left output system provided with a digital analog converter (DAC) 60L, an amplifier 62L and a speaker (SP) 64L, and to the right output system provided with a DAC 60R, an amplifier 62R and a speaker 64R. Each of the left and right output systems can convert a digital signal outputted from the accumulation circuit 52 to an analog signal, amplify the signal, and output a sound.

Figure 3:
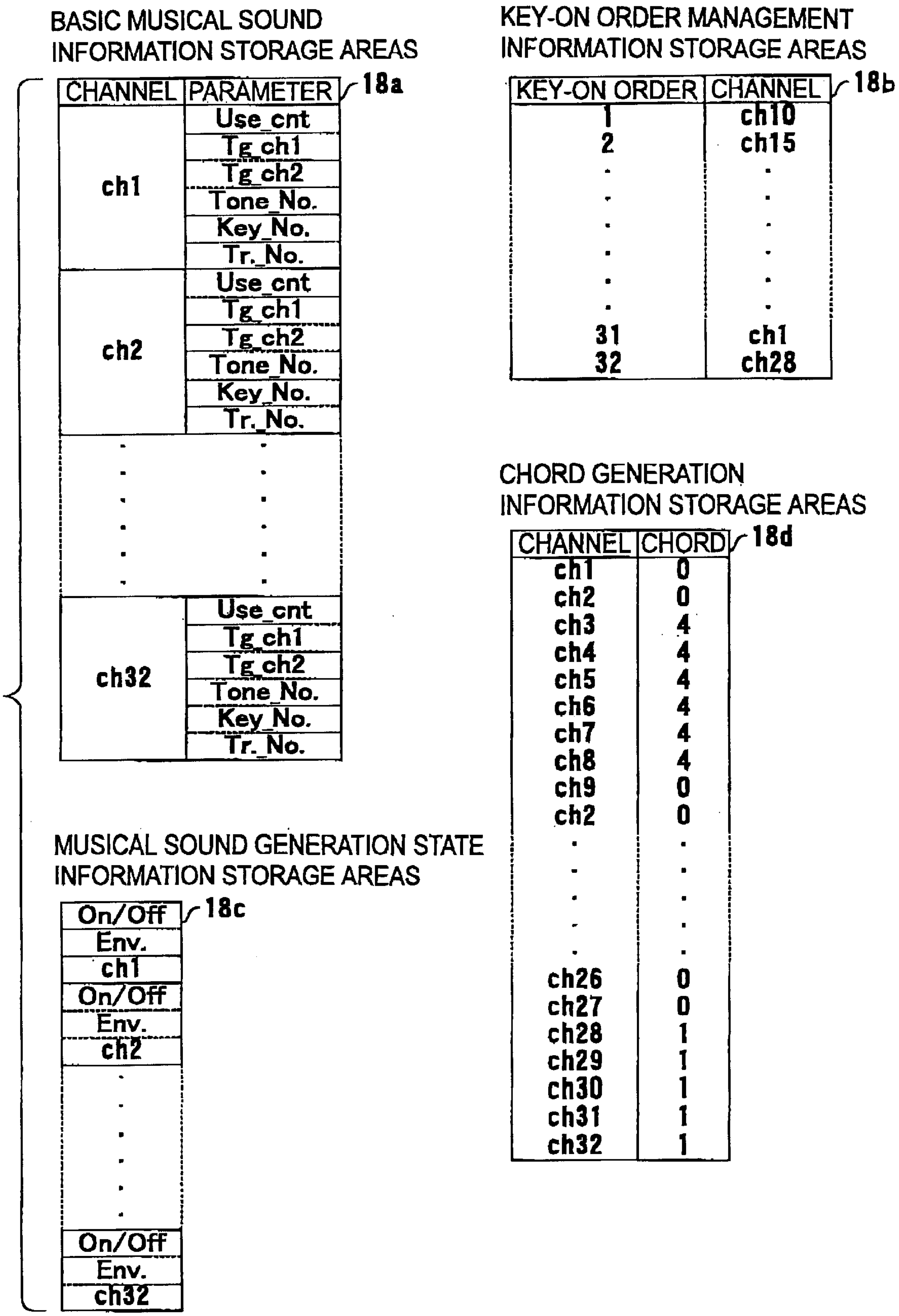
FIG. 3 is an explanatory view showing various information areas provided in a CPU work RAM of the musical sound signal generation apparatus of the embodiment.

As shown in FIG. 3, the CPU work RAM 18 is provided with four information storage areas, namely, basic musical sound information storage areas 18*a*, key-on order management information storage areas 18*b*, musical sound generation state information storage areas 18*c* and chord generation information storage areas 18*d*.

In the basic musical sound information areas 18*a*, various musical sound information to produce a sound are stored based on various sounding conditions set by the operation of the panel 20 when a key is depressed (or when a MIDI signal is inputted). The basic musical sound information areas 18*a* are provided with the areas storing various information for a maximum of 32 channels corresponding to the musical sound generation channels in the musical sound signal generation circuit 40. Each area is numbered from ch1 to ch32 (Ch#No.).

In the basic musical sound information storage areas 18*a*, sound production mode information (Use#cnt) for indicating whether the channel is in the non-sounding mode, the monaural-sounding mode or the stereo-sounding mode, channel information (Tg#ch1, Tg#ch2) for indicating the number of the musical sound generation channel for generating a sample waveform in the musical sound signal generation circuit 40, tone number information (Tone#No.) for indicating the tone parameters read from the parameter ROM 16, key number information (Key#No.) for indicating the pressed key, and track information (Tr#No.) for indicating whether the sound production is derived from a key operation or an input of a MIDI signal are stored. In the sound production mode information, a numeral value is stored in such a way that if the channel is in the non-silent mode, then "0" is stored; if the channel is in the monaural-sounding mode, then "1" is stored; and if the channel is in the stereo-sounding mode, then "2" is stored. In the channel information, the number (1–32) of the musical sound generation channel is stored. In case of stereo sounding, different numbers (for instance ch1, ch2) of the musical sound generation channel are stored in Tg#ch1, Tg#ch2, respectively. In case of monaural sounding, a number (for instance, ch3) of the musical sound generation channel is stored in Tg#ch1, and 0 in Tg#ch2. In the tone number information, in accordance with the number (for instance, 0, 1, . . . , 100) referred to each of the plurality of tone parameters, a numerical value (for example, in case of piano, then 0) is stored. In the key number information, a number referred to the key on the keyboard is stored. In the electronic instrument 10 of the present embodiment, there are 88 keys on the keyboard, and they are numbered 1–88 in order of the position of the keys from the low to high tone.

The key-on order management information storage areas 18*b* show, so to speak, the history of sound production. In those areas, the area numbers (Ch#No.) of the basic musical sound information storage areas 18*a* used for sound production are stored in order of sound production. As shown in FIG. 3, in the key-on order management information storage areas 18*b*, the area numbers (Ch#No.) of the newest channels in order of sound production are stored in the lower part of the areas.

In the musical sound generation state information storage areas 18*c*, the information related to the sounding state of each channel when a sound is produced in accordance with the sounding conditions stored in the basic musical sound information storage areas 18*a* are stored. The information includes the area number (Ch#No.), envelope phase state information (Env.) when a sound is produced in the musical sound signal generation circuit 40 based on the area number, and the sound production information indicating whether the area of the area number (Ch#No.) is in the silent mode (OFF) including the non-sounding mode, or the sounding mode (ON).

The envelope phase state information indicates 0 when the sample waveform generated in the musical sound signal generation circuit 40 is in the silent mode (truncate mode), 1 in case of the attack mode, 2 in case of the decay mode, and 3 in case of the release mode.

In the chord generation information storage areas 18*d*, in accordance with the tone number information (Tone#No.) and the key number information (Key#No.) stored in the basic musical sound information storage areas 18*a*, the information indicating whether the musical sound signal generated by each musical sound generation channel is for chord generation or not are stored. For example, when a musical sound generation channel is generating a sound other than a chord, "0" is stored in the area corresponding to the musical sound generation channel. When it is generating a chord, a positive integer such as "1", "2", . . . "n" is stored in order of chord generation.

As seen in FIG. 3, in the areas corresponding to ch1, ch2, values "0" are stored respectively. This means these channels are used for generating musical sound signals to generate a sound other than a chord. In the areas corresponding to ch3–ch8, values "4" are stored respectively. This means each of the musical sound generation channels has changed into the state of chord generation fourthly since the electronic instrument 10 has started to be played. It also means that a chord consisting of three stereo sounds are generated using six channels. In the areas corresponding to ch28–ch32, "1" is stored respectively. This means each of the musical sound generation channels has changed into the state of chord generation first since the electronic instrument 10 has started to be played. It also means a chord consisting of 1 monaural sound and 2 stereo sounds are generated using five channels. Which channel is producing the monaural sound is known by consulting the sound production mode information (Use#cnt) of the basic musical sound information storage areas.

Figure 4:
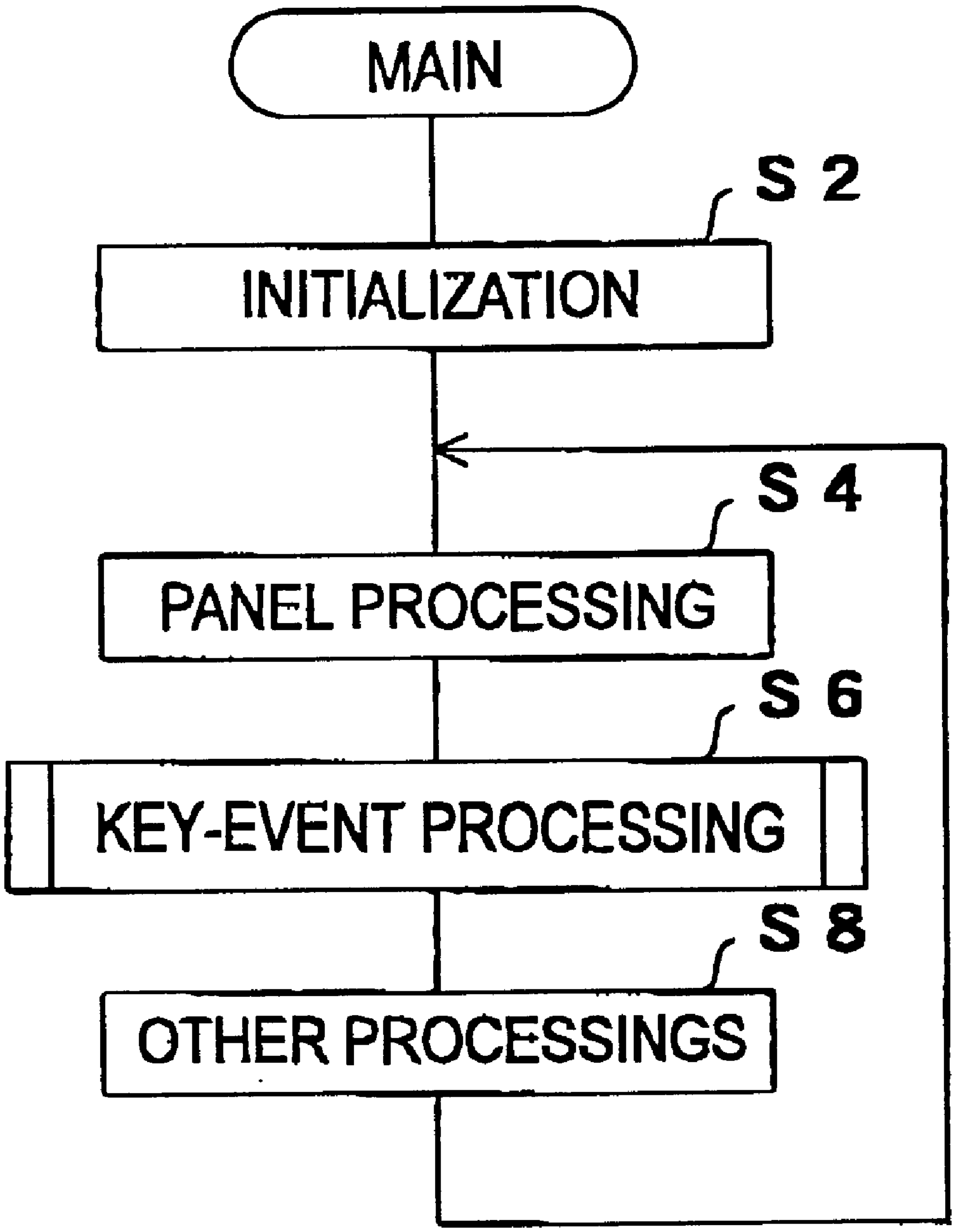
FIG. 4 is a flow chart showing a main processing executed by a CPU of the musical sound signal generation apparatus of the embodiment.
Figure 5:
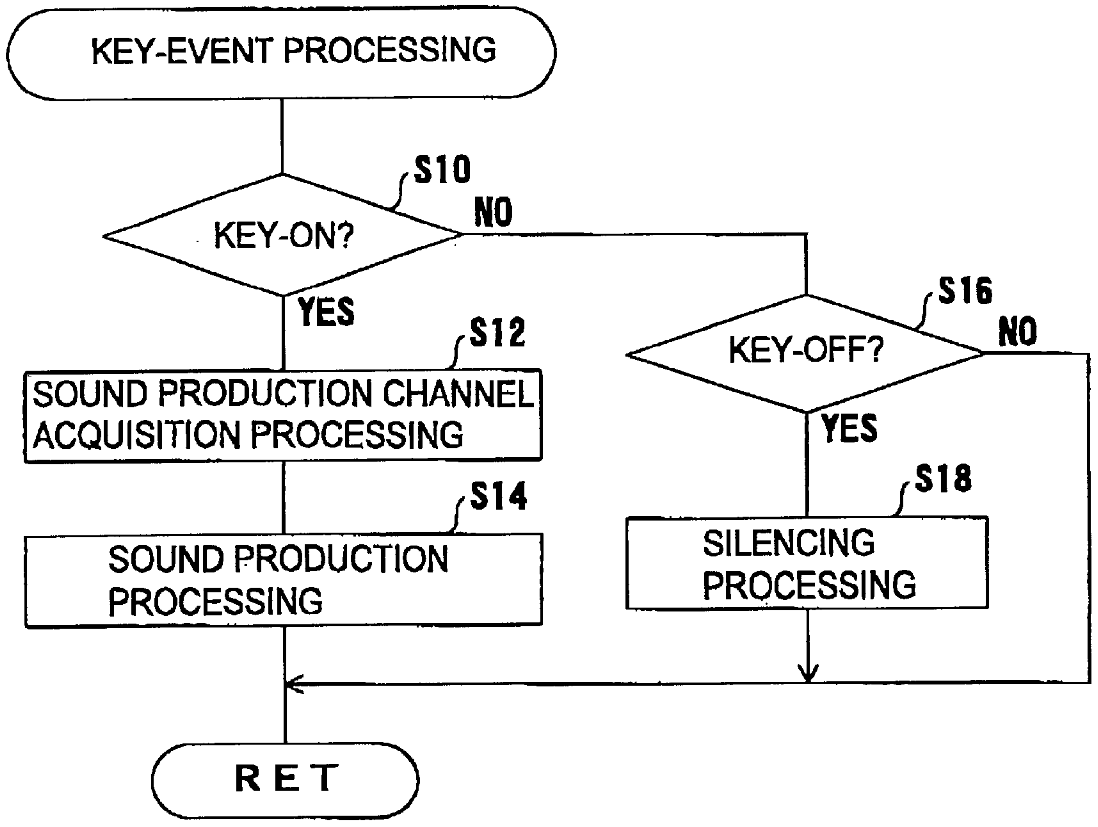
FIG. 5 is a flow chart showing a key assignment processing executed by the CPU of the musical sound signal generation apparatus of the embodiment.
Figure 6:
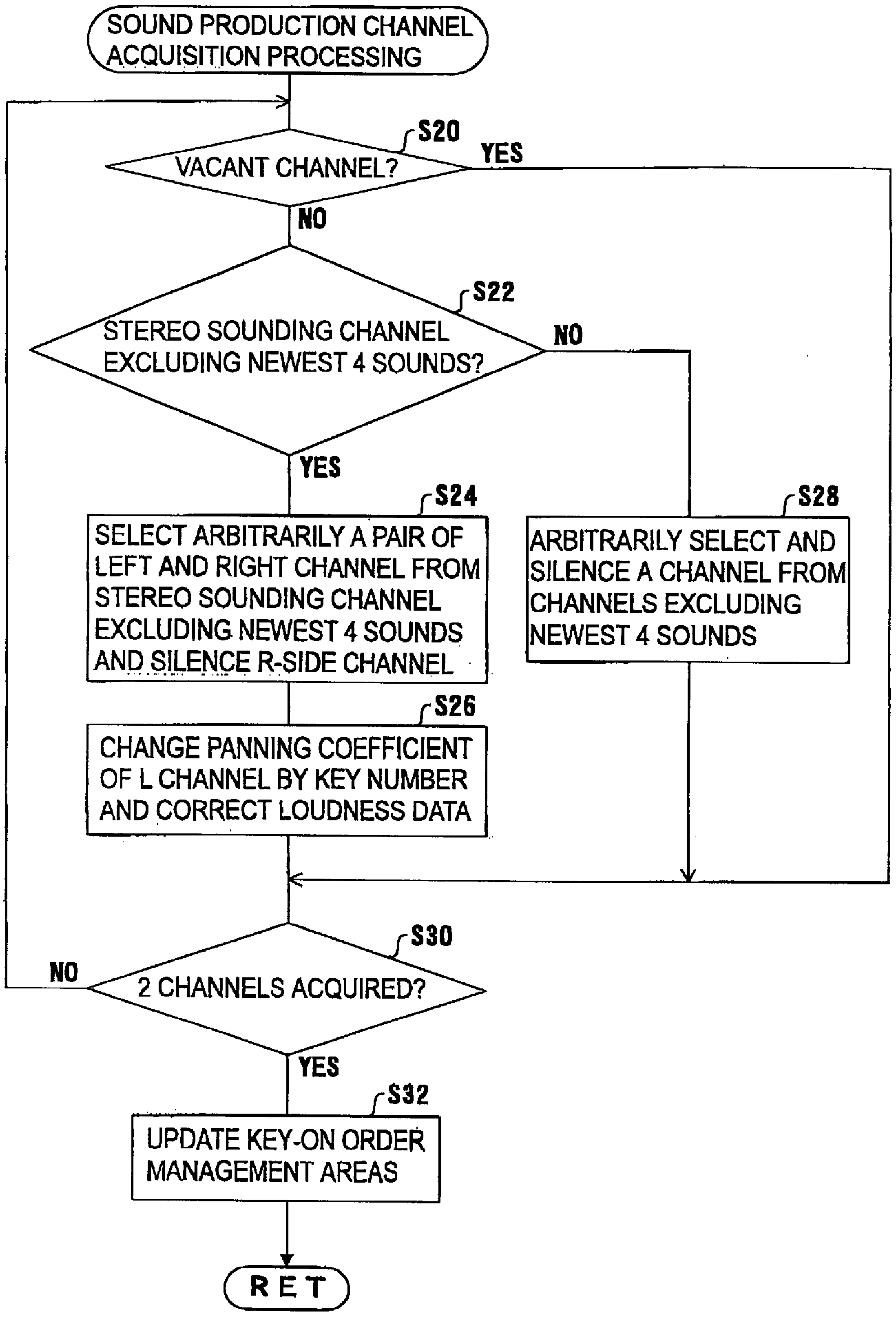
FIG. 6 is a flow chart showing a sound channel acquisition processing executed by the CPU of the musical sound signal generation apparatus of the embodiment.

In the electronic instrument 10 constituted as above, control processing executed by the CPU 12 is now explained with flowcharts illustrated in the accompanying drawings of FIGS. 4–6.

When power is supplied to the electronic instrument 10, the CPU 12 executes various initialization processings (S2). Then, it executes a panel processing (S4) for setting tones and sound volumes corresponding to ON/OFF or the position of the mode selection switch, tone selection switch and volume controller on the panel 20, a key event processing (S6) for producing a sound or silencing corresponding to a key-on/key-off, and other processings (S8) repeatedly.

In the key event processing (S6), as shown in FIG. 5, the CPU 12 determines whether there is a key-on based on the detection of the key scan circuit 28 (S10), and if a key-on is present (YES at S10), executes a sound production channel acquisition processing (S12).

In the sound production channel acquisition processing (S12), as shown in FIG. 6, the CPU 12 searches the CPU work RAM 18 to determine whether there is a vacant channel (S20). If a vacant channel is present (YES at S20), the CPU 12 skips S22–S28 and executes S30. If no vacant channel is present (NO at S20), it searches the CPU work RAM 18 again to determine whether there are at least a pair of stereo-sounding channels in the channels excluding the newest 4 channels in order of sound production(S22). If at least a pair of stereo-sounding channels exist (YES at S22), it searches the CPU work RAM 18 to select firstly the channels from the stereo-sounding channels excluding those generating musical sound signals for chords. It further selects a pair of the oldest left and right channels in order of sound production from the selected channels. Then, it silences the R side channel of the pair to secure a channel for a new key-on (S24). In S24, when all the stereo-sounding channels are generating musical sound signals for chords, a pair of the oldest channel in order of chord production are selected, and the R side channel of the selected pair is silenced to be secured for the new key-on.

The panning coefficient of the remaining L side channel is changed to be monaural sounding based on the key number of the depressed key. When the L side channel produces a monaural sound, loudness data of the L side channel is corrected in accordance with the position of the volume controller on the panel 20 so that the sound volume may be equal to volume to be outputted from both L/R side channels as a stereo sound upon the key-on (S26).

In S22, when no stereo-sounding channel is present (that is, all the channels are in the monaural-sounding mode) (NO at S22), the CPU 12 searches the CPU work RAM 18 to select firstly the channels from the monaural-sounding channels excluding those generating musical sound signals for monaural chords. It further selects the oldest channel in order of sound production from the selected channels, and then silences the selected channel to secure a channel for a new key-on (S28). In S28, when all the monaural-sounding channels are generating musical sound signals for chords, the oldest channel in order of chord production is selected and silenced to be secured for the new key-on.

The CPU 12 repeats S20–S28 until the two channels necessary for stereo sounding corresponding to a new key-on are secured. When the two channels are finally secured, the CPU 12 updates the order of the used area numbers of the basic musical sound information storage areas 18*a*, excluding the silenced channel, in the key-on order management areas 18*b* in the CPU work RAM 18 (S32). Then, turning back to FIG. 5, the secured two channels generate musical sound signals in stereo sounding corresponding to a new key-on, and the generated musical sound signals are outputted via the DACs 60L, 60R, the amplifiers 62L, 62R, and the speakers 62L, 62R (S14).

In the key event processing shown in FIG. 5, when no key-on is present (NO at S10), it is then determined whether there is a key-off (S16). When a key-off is present (YES at S16), the channel producing the sound is silenced (S18), and if no key-off is present (NO at S16), S18 is skipped and the key event processing is ended.

As explained in the above, in the electronic instrument of the present embodiment, when there is no channel (musical sound generation channel) to be used to generate a musical sound signal for producing a sound corresponding to a new key-on, a pair of channels are secured for the new key-on from the channels (28 channels) excluding the newest 4 channels in order of sound production. This mechanism makes it possible to produce a stereo sound corresponding to a new key-on. In addition, since the channels to be silenced are selected from the older channels than the newest 4 channels in sound production, it is possible to prevent the players and the audience from having a sense of incongruity occurred by silencing a sound of the key just operated.

Furthermore, when there are channels generating musical sound signals constituting a chord in the older channels than the newest 4 channels in sound production, the channels excluding those that are generating musical sound signals for a chord are firstly selected as those to be silenced by some chance (that is, to be secured as channels to generate a musical sound in stereo sounding corresponding to a new key-on), and then, in the selected channels, the oldest channels in sound production are further selected to be silenced. Accordingly, when a chord is present, it is possible to keep the state of the chord production normal. As a result, the players and the audience are not given a sense of incongruity occurred by silencing a sound constituting a chord.

In the selection of channels to be silenced, a pair of R and Left side channels in stereo sounding are selected. One channel (R side channel) out of the pair is silenced, and the other channel (L side channel) produces a monaural sound by changing the panning coefficient of the musical sound signal in accordance with the key number upon the key-on. In production of the monaural sound, the sound volume is also corrected so that it may be equal to volume when a stereo sound is produced from both the L/R sides.

The present invention is not limited to the above embodiment, and other modifications and variations are possible within the scope of the present invention.

For example, in the above embodiment, S 28 is repeated till two musical sound generation channels are secured in S30, and then the secured musical sound generation channels are assigned to channels for generating musical sound signals in stereo sounding corresponding to a new key-on. However, instead of executing S30 after S28, it is possible to newly create S31 for assigning the musical sound generation channels silenced in S28 to those for generating musical sound signals in monaural sounding corresponding to a new key-on. Then, S31 can be inserted after S28, and after the execution of S31, S32 can be executed. In addition, S14 can be replaced to S14' which, based on the key number of the depressed key, changes the panning coefficient of the musical sound signal generated in the musical sound generation channel secured by S31, and corrects the loudness data so that the loudness data based on the position of the volume controller on the panel 20 may be equal to volume to be outputted as a stereo sound from the L/R side channels upon the key-on, provided that the function of the sound production processing in S14 is principally maintained in S14'.

When two musical sound generation channels in monaural sounding are silenced for producing a stereo sound, the audience may have a sense of incongruity more or less for lack of the two sounds. However, since in S28 and S31, only one sound is silenced for monaural sounding, it is possible to prevent the audience from having a sense of incongruity to some extent.

Additionally, in the present embodiment, it is determined in S22 whether the 28 channels excluding the newest 4 channels in order of sound production are all used for stereo sounding. However, the number of channels to be excluded can be any plural channels such as 3 and 5 channels. Since a chord is generally constituted of 3–4 different sounds, it is preferred that the number of channels to be excluded is 3–4 in order to correspond with the number of sounds constituting the chord.

What is claimed is:

1. A musical sound signal generation apparatus comprising:

a plurality of musical sound signal generation means for generating musical sound signals;

a generation mode storage means for storing information on whether said musical sound signal generation means is in the sounding mode or the silent mode, and the order in which each of the musical sound signal generation means has changed into the sounding mode;

an assigning means for, when a key is operated, referring to storage contents of said generation mode storage means to select two of said musical sound signal generation means in the silent mode, directing the selected two musical sound signal generation means to respectively generate left and right musical sound signals for producing a predetermined sound in stereo sounding corresponding to the key in the selected two musical sound signal generation means, and updating the storage contents of the generation mode storage means; and output means for synthesizing the left and right musical sound signals generated in said plurality of musical sound signal generation means and respectively outputting the synthesized left and right musical sound signals;

wherein said assigning means comprises:

a first generation mode determination means for, when the key is operated, referring to the storage content of said generation mode storage means to determine whether there are musical sound signal generation means in the silent mode;

a second generation mode determination means for, in case of which it is determined by said first generation mode determination means that there are no musical sound signal generation means in the silent mode, referring to the storage contents of said generation mode storage means, and, from the musical sound signal generation means excluding a predetermined number of those which are the newest in order of sound production, determining whether there are at least two pairs of the musical sound signal generation means generating the left and right musical sounds in stereo sounding;

a first signal generation ensuring means for, in case of which it is determined by said second generation mode determination means that there are two or more pairs of said musical sound signal generation means, selecting two pairs of the musical sound signal generation means, changing one of each pair of the musical sound signal generation means into the silent mode, and updating the storage contents of said generation mode storage means; and output control means for outputting musical sound signals generated in the other two musical sound signal generation means, not changed into the silent mode by said first signal generation securing means, as the left and right musical sound signals from each of the two musical sound signal generation means.

2. A musical sound signal generation apparatus according to claim 1, wherein said allocation means comprises a second signal generation ensuring means for, in case of which it is determined by said second generation mode determination means that at least two pairs of said musical sound signal generation means generating left and right musical sound signals in stereo sounding do not exist, changing the oldest two musical sound signal generation means in order of sound production into the silent mode and updating the stored contents of said generation mode storage means.

3. A musical sound signal generation apparatus according to claim 1, wherein said output control means comprises a correction panning means for performing a panning processing to a musical sound signal to be outputted simultaneously from both left and right sides of said output means so that a predetermined sound image is obtained corresponding to an operated key.

4. A musical sound signal generation apparatus according to claim 1, wherein said output control means further comprises a volume correction means for adjusting an outputting volume of a musical sound signal to be outputted simultaneously from both left and right sides of said output means so that a predetermined sound image is obtained corresponding to an operated key.

* * * * *